United States Patent

Navarini et al.

(10) Patent No.: US 6,296,890 B1
(45) Date of Patent: Oct. 2, 2001

(54) HEAVILY FOAMING COFFEE FRACTION AND PROCESS FOR ITS MANUFACTURE

(75) Inventors: Luciano Navarini; Marino Petracco, both of Triest (IT)

(73) Assignee: Illycaffe S.p.A., Triest (IT)

( * ) Notice: Subject to any disclaimer, the term of this patent is extended or adjusted under 35 U.S.C. 154(b) by 0 days.

(21) Appl. No.: 09/482,618

(22) Filed: Jan. 14, 2000

(30) Foreign Application Priority Data

Jan. 21, 1999 (EP) .................................. 99101042

(51) Int. Cl.$^7$ ................ A23F 5/00; A23F 5/26; A23F 5/32

(52) U.S. Cl. .............. 426/594; 426/591; 426/564; 426/569

(58) Field of Search ................... 426/594, 591, 426/564, 569

(56) References Cited

U.S. PATENT DOCUMENTS 5,350,591   9/1994   Canton .

FOREIGN PATENT DOCUMENTS 0 796 562 A2   9/1997  (EP) .
1 073 738      6/1967  (GB) .

OTHER PUBLICATIONS

S. Compton "Headspace gas chromatography–fourier transform infrared spectrometry for monitoring volatiles in commercial brand coffee" LC–GC International, vol. 4, No. 3, 1991, pp. 42–47, XP002107807.

European Search Report for EP 99101042 Jun. 30, 1999.

*Primary Examiner*—Anthony J. Weier
(74) *Attorney, Agent, or Firm*—Sughrue, Mion, Zinn, Macpeak & Seas, PLLC

(57) ABSTRACT

A heavily foaming coffee fraction characterized by the following bands in the FT-IR spectrum: 3400 cm$^{-1}$, 2900 cm$^{-1}$, 1655 cm$^{-1}$, 1524 cm$^{-1}$ 1000–1150 cm$^{-1}$, 894 cm$^{-1}$ and 876 cm$^{-1}$ and a production process for the coffee fraction (1) defatting with an organic solvent and extracting with hot water, (2) filtrating the extract, (3) adding a precipitation agent to the extract and centrifugation of the obtained precipitate, (4) dissolving the precipitate in water or an aqueous alcohol, (5) dialysing the solution against water, (6) filtrating the non-dialysable solution and (7) freeze-drying the filtrate.

3 Claims, 4 Drawing Sheets

(1 of 4 Drawing Sheet(s) Filed in Color)

HEAVILY FOAMING COFFEE FRACTION AND PROCESS FOR ITS MANUFACTURE

This invention relates to a heavily foaming coffee fraction, a process for its manufacture, and its application as an additive to instant coffee, resp. coffee extract.

Instant coffee is a beverage, well-known since decades. The product in question is a powdery and residue-free coffee product instantly soluble in water that is obtained by aqueous extraction of ground coffee and subsequent drying, preferentially by lyophilisation. The main advantage of instant coffee lies in the fact that a coffee drink may easily be obtained by simply dissolving the product in hot water without utilisation of a coffee machine. A disadvantage vs. roast coffee, however, is the only minor formation of foam in the cup after preparation of the beverage, p.e. is highly important for cups of expresso coffees.

Many attempts had been made to improve the foaming properties of instant coffee. One proposal is the addition of bicarbonates; that, however, has the disadvantage of forming of too large gas bubbles. Foam is a biphasic system composed of gas bubbles within a liquid film, constituted by an aqueous solution of surfactants. In roast coffee there is a two-layer configuration of surface-active molecules with water molecules between them. The high strength of the film explains the honeycomb-like structure formed by small bubbles growing together.

The object of the present invention is to overcome said disadvantages and to provide a strongly foaming coffee fraction, suitable as additive for coffee extracts.

Surprisingly it was found that a coffee fraction may be isolated from roasted coffee, preferably dark roasted coffee, that shows strong foaming properties of a beverage, prepared from instant coffee, where the fractions had been added individually.

Thus, there is provided according to this invention a heavily foaming coffee fraction which is characterized by the following bands in the FT-IR-spectrum: 3400 $cm^{-1}$, 2900 $cm^{-1}$, 1655 $cm^{-1}$, 1524 $cm^{-1}$, 1000–1150 $cm^{-1}$, 894 $cm^{-1}$ and 876 $cm^{-1}$.

The invention also provides a process for the production of said coffee fraction comprising the following steps:

(1) defatting of ground, roasted coffee with an organic solvent and extracting of the defatted ground, dark roasted coffee with hot water,
(2) filtrating the extract obtained from step (1),
(3) adding a precipitation agent to the extract obtained from step (2) and centrifugation of the thus obtained precipitate,
(4) dissolving the precipitate obtained from step (3) in water or an aqueous alcohol,
(5) dialysing the solution obtained in step (4) against water,
(6) filtrating the non-dialysable solution and
(7) freeze-drying the filtrate obtained in step (6).

As stated above, the heavily foaming coffee fraction of this invention is characterized by the following bands in in the FT-IR-spectrum: 3400 $cm^{-1}$ (OH and NH stretching), 2900 $cm^{-1}$ (CH stretching), 1655 $cm^{-1}$ (Amide I band), 1524 $cm^{-1}$ (Amide II band), 1000–1150 $cm^{-1}$ (C—O—C stretching), 894 $cm^{-1}$ and 876 $cm^{-1}$ (carbohydrate anomeric bands).

Moreover, the heavily foaming coffee fraction of the present invention is characterized by certain proton signals in the 1H-NMR-spectrum, namely: carbohydrate proton signals (3–5 ppm), aliphatic proton signals (0.5–2.5 ppm), aromatic proton signals (around 7.0 ppm).

Furthermore, the coffee fractions of the present invention are characterized by values of surface tension less than 55 mN/m as 3.7–3.9 g/l aqueous solution at 25° C. A further characterization of-the coffee fraction of the present invention is given by the values for persistency and consistency after mixing with conventional coffee powder.

In the following the production process for the coffee fraction of the present invention will be described in detail:

Step 1

In this step ground, dark roasted coffee, for example Coffea Arabica origin, is defatted in known manner by heating with an organic solvent under reflux in a suitable apparatus, e.g. a Soxhlet apparatus. As far as the organic solvent is concerned aliphatic or aromatic hydrocarbons such as hexane, benzene, diisopropylether, petrolether, diethylether and dichloromethane may be used. A preferred organic solvent is n-hexane. Alternatively the defatting can be carried out using the known supercritical carbon dioxide technique as described in German patent 21 06 133 under pressure and at temperatures of 20–50° C., preferably 40° C. In accordance with this technique the fatty substances are removed by circling the carbon dioxide through the coffee containing pressure vessel and transferring the solute into an adsorption pressure vessel containing activated charcoal.

After said defatting treatment the defatted and dried product is subjected to an extraction process using hot water of about 80° C. to 100° C., preferably about 90° C. The extraction step may be repeated once or twice or more. As stated, the extraction agent is hot water including ion exchanged water such as Milli-Q water.

Step 2

The extract obtained from step 1 is filtrated and the solid filter residue is discarded. The filtration is carried out according to the filtration techniques used in the coffee industries using known filtration apparatuses.

Step 3

To the filtrate obtained from step 2 a suitable precipitation agent is added. Suitable precipitation agents are ammonium sulfate, ethyl alcohol, acetone, acid and ethyl alcohol-acetic acid mixtures, ammonium sulfate or ethyl alcohol being preferred. The mixture is aged for some time, e.g. overnight, at low temperatures, e.g. temperatures in the range of 0–80° C., preferably 4° C. The resulting precipitate is collected by centrifuging in usual manner.

Step 4

The precipitate from step 3 is dissolved in water or an aqueous alcohol, such as aqueous ethyl alcohol, if necessary under heating.

Step 5

The thus obtained solution is dialysed extensively against water, e.g. an aqueous NaCl solution and Milli-Q water (in this sequence).

Step 6

The non-dialysable solution from step 5 is filtrated using conventional filtration techniques.

Step 7

The filtrate from step 6 is freeze-dried in the usual way. A preferred procedure comprises freezing the filtrate from Step 6 in liquid nitrogen and lyophilizing at room temperature and a pressure of 0.2 mbar.

The following Examples and Figures illustrate the coffee fraction of the present invention as well as the process for its manufacture.

BRIEF DESCRIPTION OF THE DRAWING

The patent or application file contains at least one drawing executed in color. Copies of this patent with colored drawing will be provided by the Office upon request and payment of the necessary fee.

Figure 1:
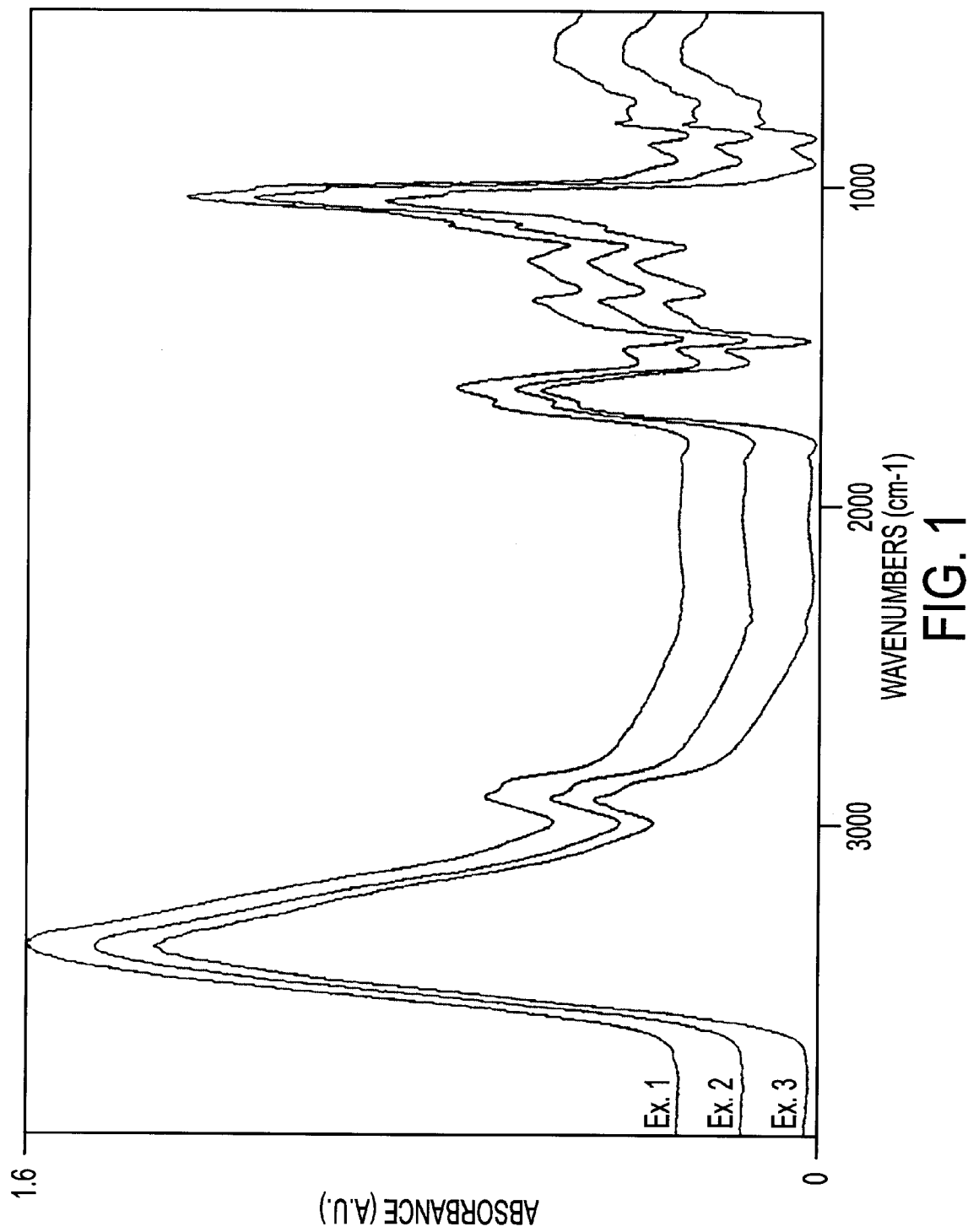
FIG. 1 shows the FTIR spectra of the inventive foaming coffee fractions of Examples 1, 2 and 3.

In Examples 1–3 the FTIR spectra were recorded using a Perkin-Elmer 1750 spectrometer interfaced with a Perkin-Elmer 7300 data processor. Pellets were prepared using 200 mg of IR spectroscopic grade KBr and 2 mg of freeze-dried samples previously maintained for 24 h in a dessiccator under low pressure.

All $^1$H-NMR spectra were recorded at 4.70 Tesla ($^1$H, 200.13 MHz and $^{13}$C, 50.32 MHz) with a Bruker AC 200 instrument equipped with a multinuclear 5 mm probe. 10–15 mg of any sample were dissolved with 0.5 ml of $D_2O$ directly inside the NMR tube and the analysis was performed at 60° C.

Example 1

Extraction, Isolation and Characterization of the Foaming Fraction SF

Ground dark roasted defatted Santos arabica coffee (80 g) was extracted twice for 1 h with boiling Milli-Q water (350 ml). The solid residue was filtered off, ammonium sulfate was added to give a saturated solution and the mixture was maintained at 4° C. overnight. The resulting precipitate was collected by centrifugation, dissolved in water and extensively dialysed against Milli-Q water. After dialysis and filtration, the solution was freeze-dried to give a fluffy dark brown material (4.0 g). The water content in the freeze-dried material was 7.41% (weight loss up to 150° C. by thermogravimetry). The yield (corrected for the water content) was 4.63% w/w of defatted ground dark roasted coffee.

Elemental analysis: C 47.6%; H 5.88%; N 2.92%

Molecular weight: 17.930 Da

Surface tension: 52.13 mN/m (3.7 g/l aqueous solution at 25° C.)

FTIR spectrum (see FIG. 1): 3400 cm$^{-1}$ (OH and NH stretching), 2900 cm$^{-1}$ (CH stretching), 1655 cm$^{-1}$ (Amide I band), 1524 cm$^{-1}$ (Amide II band), 1000–1150 cm$^{-1}$ (C—O—C stretching), 894 and 876 cm$^{-1}$ (carbohydrate anomeric bands).

Figure 2:
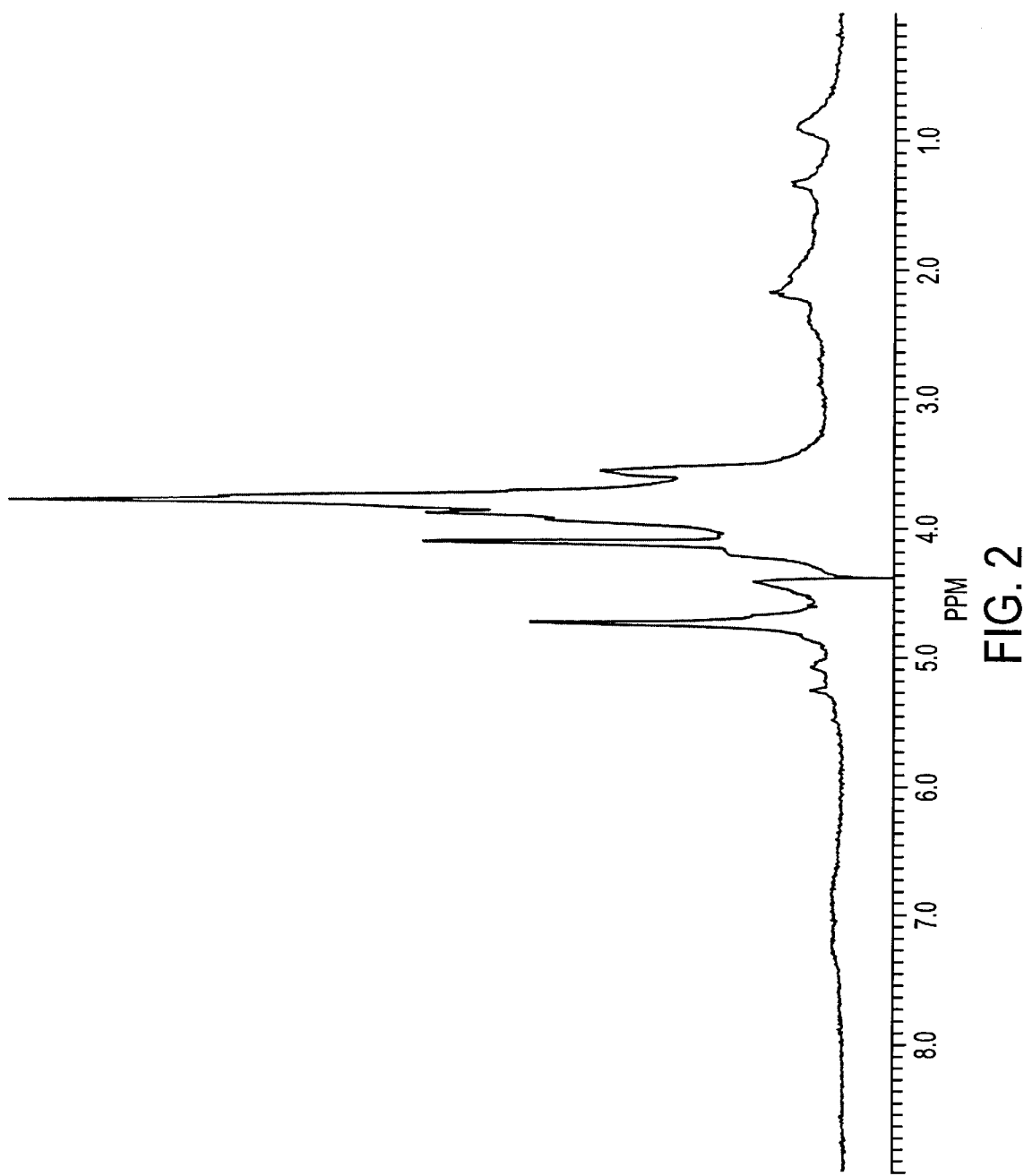
FIG. 2 shows the $^1$H-NMR spectra of the foaming coffee fractions of the present invention of Examples 1–3.
Figure 3:
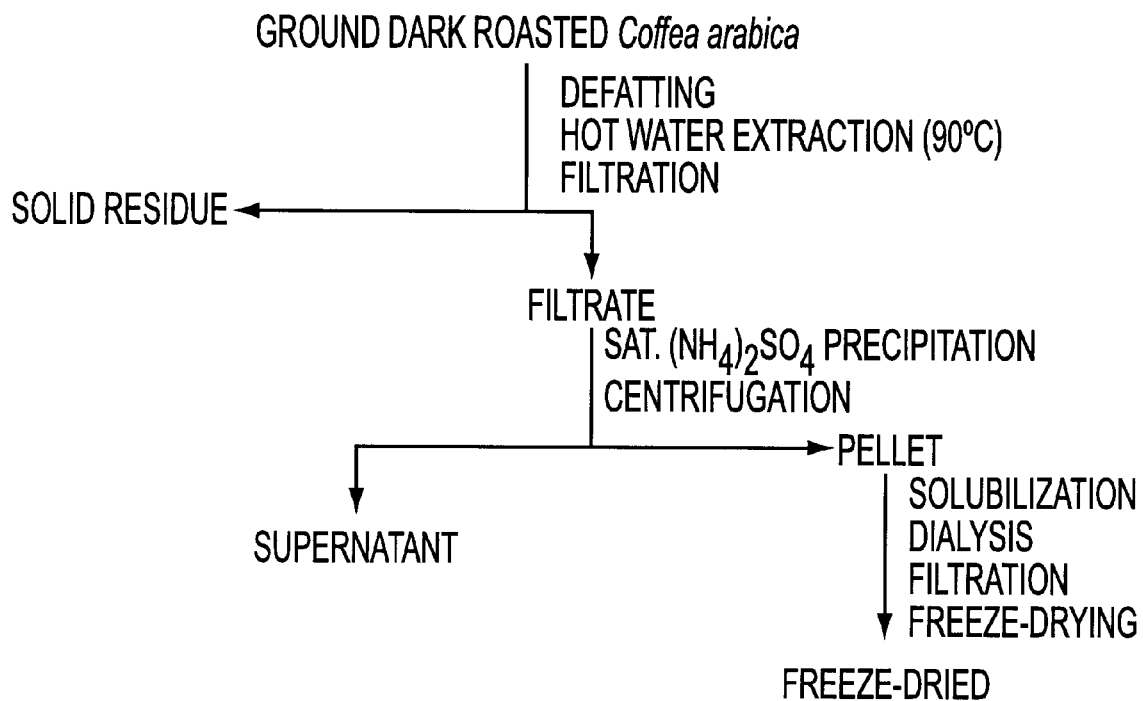
FIG. 3 shows the process steps for the production of the foaming coffee fractions of the present invention, and FIG. 4 comprises a photographic color picture showing the foaming activity of the isolated foaming fractions of the present invention.

$^1$H-NMR spectrum (see FIG. 2): carbohydrate proton signals (3–5 ppm), aliphatic proton signals (0.5–2.5 ppm), aromatic proton signals (around 7.0 ppm)

Example 2

Extraction, Isolation and Characterization of the Foaming Fraction GV

Ground dark roasted defatted Giava robusta coffee (80 g) was extracted twice for 1 h with boiling Milli-Q water (350 ml). The solid residue was filtered off, ammonium sulfate was added to give a saturated solution and the mixture was maintained at 4° C. overnight. The resulting precipitate was collected by centrifugation, dissolved in water and extensively dialysed against Milli-Q water. After dialysis and filtration, the solution was freeze-dried to give a fluffy dark brown material (3.1 g). The water content in the freeze-dried material was 6.36% (weight loss up to 150° C. by thermogravimetry). The yield (corrected for the water content) was 3.63% w/w of defatted ground dark roasted coffee.

Elemental analysis: C 48.6%; H 6.02%; N 3.52%

Molecular weight: 17.040 Da

Surface tension: 51.50 mN/m (3.9 g/l aqueous solution at 25° C.)

FTIR spectrum (see FIG. 1): 3400 cm$^{-1}$ (OH and NH stretching), 2900 cm$^{-1}$ (CH stretching), 1655 cm$^{-1}$ (Amide I band), 1524 cm$^{-1}$ (Amide II band), 1000–1150 cm$^{-1}$ (C—O—C stretching), 894 and 876 cm$^{-1}$ (carbohydrate anomeric bands).

$^1$H-NMR spectrum (see FIG. 2): carbohydrate proton signals (3–5 ppm), aliphatic proton signals (0.5–2.5 ppm), aromatic proton signals (around 7.0 ppm)

Example 3

Extraction, Isolation and Characterization of the Foaming Fraction UF

Ground dark roasted defatted Uganda robusta coffee (79.7 g) was extracted twice for 1 h with boiling Milli-Q water (350 ml). The solid residue was filtered off, ammonium sulfate was added to give a saturated solution and the mixture was maintained at 4° C. overnight. The resulting precipitate was collected by centrifugation, dissolved in water and extensively dialysed against Milli-Q water. After dialysis and filtration, the solution was freeze-dried to give a fluffy dark brown material (3.8 g). The water content in the freeze-dried material was 6.27% (weight loss up to 150° C. by thermogravimetry). The yield (corrected for the water content) was 4.47% w/w of defatted ground dark roasted coffee.

Elemental analysis: C 49.9%; H 5.77%; N 3.96%

Molecular weight: 14.420 Da

Surface tension: 52.95 mN/m (3.8 g/l aqueous solution at 25° C.)

FTIR spectrum (see FIG. 1): 3400 cm$^{-1}$ (OH and NH stretching), 2900 cm$^{-1}$ (CH stretching), 1655 cm$^{-1}$ (Amide I band), 1524 cm$^{-1}$ (Amide II band), 1000–1150 cm$^{-1}$ (C—O—C stretching), 894 and 876 cm$^{-1}$ (carbohydrate anomeric bands).

$^1$H-NMR spectrum (see FIG. 2): carbohydrate proton signals (3–5 ppm), aliphatic proton signals (0.5–2.5 ppm), aromatic proton signals (around 7.0 ppm)

Example 4

4.1. Comparative Foaming Activity of the Isolated Foaming Fractions

Figure 4:
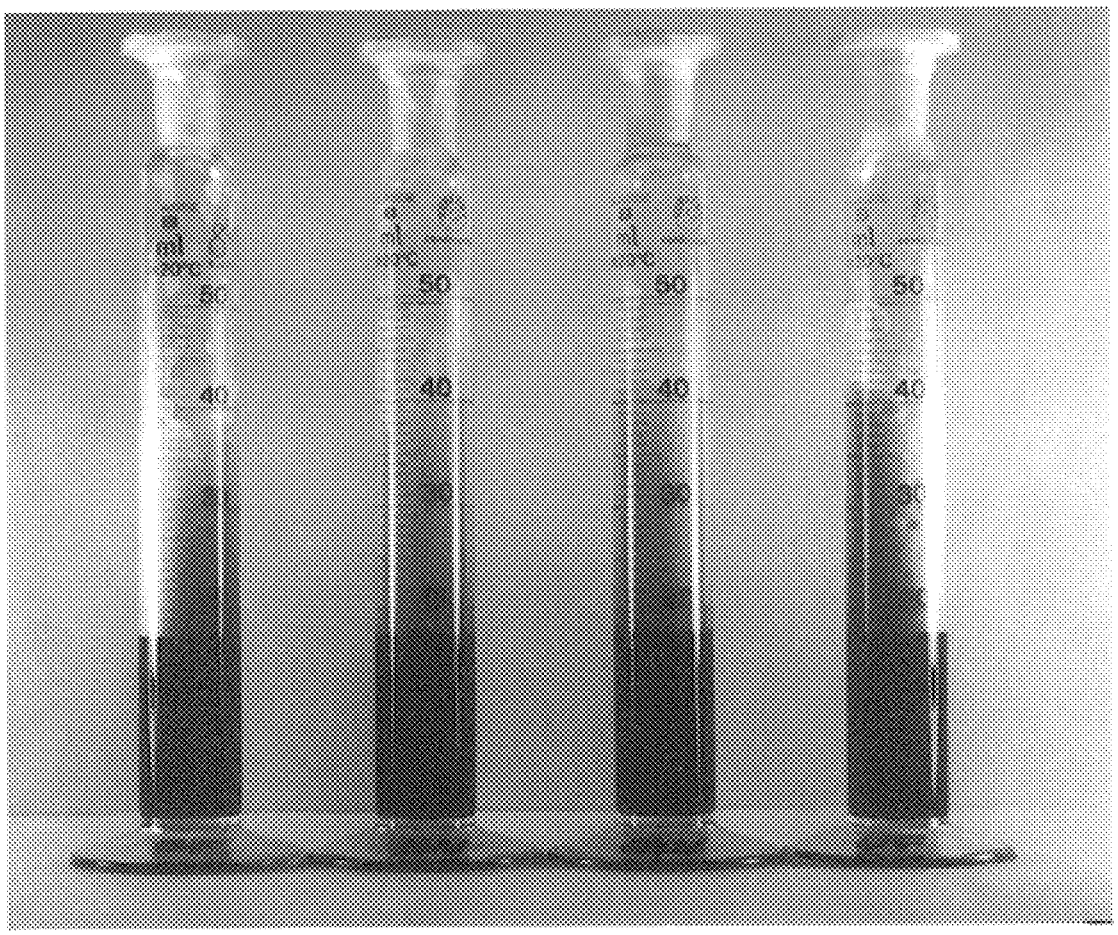

By using the foaming fractions of Examples 1–3, 20 ml of aqueous solution (concentration 4 g/l) of each fraction were introduced in a 50 ml graduated stoppered glass cylinder. The three cylinders were contemporarily wrist shaken for 10 sec and after 5 min at rest the photograph reported in FIG. 4 was taken. In all cases the total volume in the cylinder resulted to be 40 ml with a ratio liquid/foam volume close to 1.

4.2. Foam Properties 1 g of high quality Italian soluble coffee was dissolved in 30 ml of Milli-Q water in a glass cylinder graduated in millimeters. The resulting solution was stirred for 10 sec by using a Moca Crem stirrer. After 30 sec at rest the liquid and the foam levels were recorded. After 20 min the recording was repeated. The ratio liquid/foam level after 30 sec is called "Volume" while the ratio liquid/foam level after 20 min is called "Persistency". 1 g of high quality Italian soluble coffee powder was dissolved in 30 ml of Milli-Q water in a 50 ml high (tall) form glass beaker. The resulting solution was stirred for 30 sec by using a Moca Crem stirrer. The beaker was located on the plate of the Stevens LFRA-Texture Analyser equipped with a plexiglass cylindrical probe (diameter 2.55 mm; length 3.5 mm) after setting the following parameters: distance: 15 mm; speed: 0.2 mm/sec. In the course of the penetration of the probe into the foam the load (in grams) was recorded. The final load is called "Consistency".

Volume, Persistency and Consistency were measured also after adding 100 mg of the foaming fractions of Examples 1–3 in the starting solutions of high quality Italian soluble coffee.

The results are reported in the following Table:

| Fraction | Volume | Persistency | Consistency |
|---|---|---|---|
| high quality Italian soluble coffee | 1.6 | 4.30 | 6.4 |
| high quality Italian soluble coffee + fraction of Example 1 | 1.5 | 2.55 | 9.0 |
| high quality Italian soluble coffee + fraction of Example 2 | 1.5 | 2.88 | 8.6 |
| high quality Italian soluble coffee + fraction of Example 3 | 1.6 | 2.88 | 9.2 |

What is claimed is:

1. Heavily foaming coffee fraction, characterized by the following bands in the FT-IR-spectrum: 3400 $cm^{-1}$, 2900 $cm^{-1}$, 1655 $cm^{-1}$, 1524 $cm^{-1}$, 1000–1150 $cm^{-1}$, 894 $cm^{-1}$ and 876 $cm^{-1}$.

2. Process for the production of the coffee fraction according to claim 1, characterized by the following steps:
   (1) defatting of ground, roasted coffee with an organic solvent and extracting of the defatted ground, dark roasted coffee with hot water,
   (2) filtrating the extract obtained from step (1),
   (3) adding a precipitation agent to the extract obtained from step (2) and centrifugation of the thus obtained precipitate,
   (4) dissolving the precipitate obtained from step (3) in water or an aqueous alcohol,
   (5) dialysing the solution obtained in step (4) against water to obtain a non-dialysable solution,
   (6) filtrating the non-dialysable solution and
   (7) freeze-drying the filtrate obtained in step (6).

3. A process for manufacturing coffee which comprises adding the coffee fraction according to claim 1 as a foam-generating additive to instant coffee.

* * * * *